US006801214B1

United States Patent
Moriwaki et al.

(10) Patent No.: US 6,801,214 B1
(45) Date of Patent: Oct. 5, 2004

(54) THREE-DIMENSIONAL GRAPHICS SYSTEM REDUCING COLOR DATA/BITS IN DRAWING OPERATIONS FOR FASTER PROCESSING

(75) Inventors: Shohei Moriwaki, Tokyo (JP); Yoshifumi Azekawa, Tokyo (JP); Osamu Chiba, Tokyo (JP)

(73) Assignee: Renesas Technology Corp., Tokyo (JP)

( * ) Notice: Subject to any disclaimer, the term of this patent is extended or adjusted under 35 U.S.C. 154(b) by 328 days.

(21) Appl. No.: 09/603,916

(22) Filed: Jun. 26, 2000

(30) Foreign Application Priority Data

Dec. 27, 1999 (JP) .......................................... 11-370186

(51) Int. Cl.[7] ................................................ G09G 5/02
(52) U.S. Cl. ..................................... 345/600; 345/601
(58) Field of Search ............................... 345/153–155, 345/600–605, 586; 382/162–167

(56) References Cited

U.S. PATENT DOCUMENTS

| 5,432,893 A | * | 7/1995 | Blasubramanian et al. | 345/600 |
| 5,506,946 A | * | 4/1996 | Bar et al. | 345/600 |
| 5,544,284 A | * | 8/1996 | Allebach et al. | 345/603 |
| 5,572,636 A | * | 11/1996 | Sakuraba et al. | 345/586 |
| 5,838,389 A | * | 11/1998 | Mical et al. | 345/602 |
| 5,930,387 A | * | 7/1999 | Chan et al. | 382/166 |

FOREIGN PATENT DOCUMENTS

| JP | 8-161527 | 6/1996 |
| JP | 8-222632 | 8/1996 |

OTHER PUBLICATIONS

English Abstract for Japanese Patent Application Laid–Open No. 9–22279 (1997) "Color Display Device".

* cited by examiner

Primary Examiner—Matthew C. Bella
Assistant Examiner—Anthony J. Blackman
(74) Attorney, Agent, or Firm—Oblon, Spivak, McClelland, Maier & Neustadt, P.C.

(57) ABSTRACT

An object is to obtain a three-dimensional graphics system capable of color display with reduced operation time. A color data transform portion (2A) extracts the upper k (k<n) bits from n bits for each of R, G and B in RGB original color data (C1) in geometrically-processed three-dimensional data (D1) and transforms the RGB original color data (C1) into reduced color data (C2) in such a manner that the sets of k bits are assigned respectively to R, G and B, thus providing color data for three-dimensional data (D2) to be used in the drawing operation. A drawing operation portion (3A) applies drawing operations including color processing operation based on the reduced color data (C2) to the three-dimensional data for drawing operation (D2) obtained from the color data transform portion (2A) and outputs three-dimensional graphic drawing data to a drawing unit (4). The drawing unit (4) displays three-dimensional graphics in color on a display screen in a display unit.

7 Claims, 8 Drawing Sheets

THREE-DIMENSIONAL GRAPHICS SYSTEM REDUCING COLOR DATA/BITS IN DRAWING OPERATIONS FOR FASTER PROCESSING

BACKGROUND OF THE INVENTION

1. Field of the Invention

The present invention relates to a three-dimensional graphics system capable of three-dimensional graphics color display.

2. Description of the Background Art

A conventional three-dimensional graphics system has a geometric operation portion, a drawing operation portion, a drawing executing portion, and a drawing unit. The geometric operation portion performs geometric operations to obtain geometrically-processed three-dimensional data; for example, on the basis of three-dimensional object data defining three-dimensional objects arranged on a virtual three-dimensional space, the geometric operation portion computes, for each frame, two-dimensionally projected coordinates of the objects defined by the three-dimensional object data, as seen from a certain visual point.

The drawing operation portion performs drawing operations on the basis of the geometrically-processed three-dimensional data and provides three-dimensional graphic drawing data which is defined in pixels on a two-dimensional space assigned in a frame memory.

The drawing unit provides three-dimensional graphics display on a two-dimensional display screen in a display unit on the basis of the three-dimensional graphics drawing data.

The three-dimensional object data, the geometrically-processed three-dimensional data and the three-dimensional graphic drawing data each include three-dimensional coordinate data (X, Y, Z), α value (data which indicates transmittance), color data (R, G, B), and texture coordinate data (U, V) for each vertex forming three-dimensional objects.

Accordingly, even when changing only the color of an object, the geometric operation portion and the drawing operation portion must compute on the basis of three-dimensional object data defining the changed color data, which unnecessarily consumes the processing time.

SUMMARY OF THE INVENTION

According to a first aspect of the present invention, a three-dimensional graphics system comprises: color data transforming means receiving three-dimensional data defining a three-dimensional object and having original color data with a predetermined number of bits, for transforming the original color data into reduced color data composed of a smaller number of bits than the predetermined number of bits to generate three-dimensional data for operation; and processing means for applying processing including color processing operation based on the reduced color data to the three-dimensional data for operation to generate graphics drawing data corresponding to the three-dimensional object.

Preferably, according to a second aspect of the invention, in the three-dimensional graphics system, the processing means comprises color information storage means containing a plurality of pieces of display color information in a one-to-one correspondence with a plurality of color specifications definable with at least part of the reduced color data, and the processing means reads from the color information storage means the display color information corresponding to the color specifications defined by at least part of the reduced color data on the basis of the reduced color data and performs the color processing operation.

Preferably, according to a third aspect of the invention, in the three-dimensional graphics system, at least part of the plurality of pieces of display color information stored in the color information storage means can be changed in its contents.

Preferably, according to a fourth aspect of the invention, in the three-dimensional graphics system, the three-dimensional data further comprises display color selecting information and the three-dimensional data for operation further comprises the display color selecting information. The plurality of pieces of display color information comprise a first number of pieces of first display color information in a one-to-one correspondence with a first number of first color specifications which can be defined with a first number of bits in the reduced color data and a second number of pieces of second display color information in a one-to-one correspondence with a second number of second color specifications which can be defined with a second number of bits in the reduced color data, and the color information storage means comprises first color information storage means containing the first number of pieces of first display color information and second color information storage means containing the second number of pieces of second display color information. The color processing operation performed by the processing means comprises a first color processing operation performed by reading from the first color information storage means the first display color information corresponding to the first color specifications defined by the first number of bits in the reduced color data, and a second color processing operation performed by reading from the second color information storage means the second display color information corresponding to the second color specifications defined by the second number of bits in the reduced color data. The processing means performs one of the first and second color processing operations on the basis of the color specification selecting information in the three-dimensional data for operation, and the second number of pieces of second display color information stored in the second color information storage means can be changed in its contents.

Preferably, according to a fifth aspect of the invention, in the three-dimensional graphics system, the first number of pieces of first display color information stored in the first color information storage means cannot be changed.

Preferably, according to a sixth aspect of the invention, in the three-dimensional graphics system, the display color information comprises information equivalent in amount to the information in the original color data.

According to a seventh aspect of the invention, a three-dimensional graphics system comprises: color data transforming means receiving three-dimensional data defining a three-dimensional object and having original color data with a predetermined number of bits, for transforming the original color data into color data for operation to generate three-dimensional data for operation; and processing means for applying processing including a color processing operation based on the color data for operation to the three-dimensional data for operation to generate graphics drawing data corresponding to the three-dimensional object, the processing means comprising color information storage means containing a plurality of pieces of display color information in a one-to-one correspondence with a plurality of color specifications which can be defined with at least part of the color data for operation, the processing means reading from the color information storage means the display color information corresponding to the color specifications defined by at least part of the color data for operation and performing a first color processing operation, the color processing operation including the first color processing operation, wherein the plurality of pieces of display color information stored in the color information storage means can be changed in its contents.

Preferably, according to an eighth aspect of the invention, in the three-dimensional graphics system, the three-dimensional data further comprises display color selecting information, the three-dimensional data for operation further comprises the display color selecting information, and the color data for operation comprises the original color data itself. The processing means performs, as the color processing operation, one of the first color processing operation and a second color processing operation based on all information in the color data for operation, on the basis of the display color selecting information in the three-dimensional data for operation.

According to the three-dimensional graphics system of the first aspect of the invention, the processing means uses the reduced color data having a fewer bits than the predetermined number of bits as color data corresponding to the original color data, so that the operation time consumed by the processing means can be reduced by the reduction in bit number of the color data.

According to the three-dimensional graphics system of the second aspect, the processing means appropriately reads from the color information storage means the display color information corresponding to the reduced color data by using the reduced color data as the index data. The processing means can thus smoothly perform the color processing operation on the basis of the reduced color data with a smaller number of bits than the predetermined number of bits in the original color data.

According to the three-dimensional graphics system of the third aspect, the contents of at least part of the pieces of display color information stored in the color information storage means can be changed from outside, so that the contents of the color display provided by the display means which display three-dimensional graphics in color on a two-dimensional screen on the basis of the graphics drawing data, can be changed by changing the contents of the display color information corresponding to the color specifications defined by at least part of the reduced color data, without the need to change the contents of the reduced color data.

As a result, when re-displaying the same three-dimensional object in different coloring, the colors can be changed just by changing the contents of the display color information, without changing the three-dimensional data and the three-dimensional data for operation, which allows the processing means to perform the operation at high speed without overhead at all, thus remarkably improving the processing performance of the entire three-dimensional graphics system.

According to the three-dimensional graphics system of the fourth aspect, the contents of the second number of pieces of second display color information stored in the second color information storage means can be changed from outside. Accordingly, when the processing means performs the second color processing operation, the contents of the color display can be changed by changing the contents of the second display color information corresponding to the color specifications defined by the second number of bits in the reduced color data, without changing the contents of the reduced color data.

According to the three-dimensional graphics system of the fifth aspect of the invention, the contents of the first number of pieces of first display color information stored in the first color information storage means cannot be changed from outside. Hence, when the processing means performs the first color processing operation, stable color display can be presented by always using the same kinds of colors.

According to the three-dimensional graphics system of the sixth aspect of the invention, the amount of the display color information is equivalent to that of the original color data, so that the display color information can represent colors equivalent to the colors represented by the original color data.

According to the three-dimensional graphics system of the seventh aspect of the invention, the contents of the pieces of display color information stored in the color information storage means can be changed from outside. Accordingly, when the processing means performs the first color processing operation, the contents of the color display can be changed by changing the contents of the display color information corresponding to the color specifications defined by at least part of the color data for operating, without changing the contents of the color data for operating.

As a result, when re-displaying the same three-dimensional object in different coloring, the colors can be changed without changing the three-dimensional data and the graphics drawing data at all, which allows the processing means to perform the operation at high speed without overhead at all, thus significantly improving the processing performance of the entire three-dimensional graphics system.

According to the three-dimensional graphics system of the eighth aspect of the invention, the processing means performs one of the first color processing operation and the second color processing operation based on all information in the color data for operation, on the basis of the display color selecting information in the three-dimensional data for operation.

As a result, since the color data for operation is the original color data itself, all kinds of colors that the original color data can represent can be used in color display when the processing means performs the second color processing operation.

The present invention has been made to solve the problem above, and an object of the present invention is to provide a three-dimensional graphics system capable of color display with reduced operation time.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
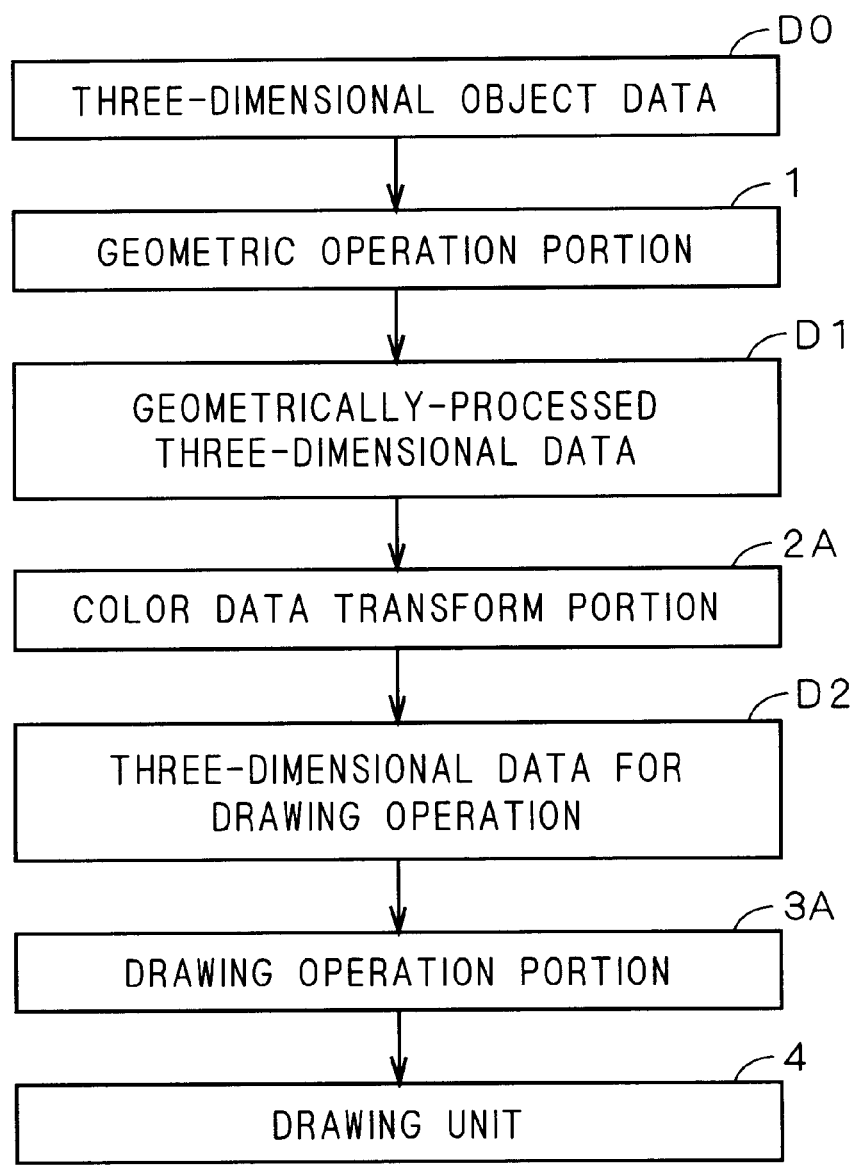
FIG. 1 is a block diagram showing the structure of a three-dimensional graphics system according to a first preferred embodiment of the present invention.
Figure 2:
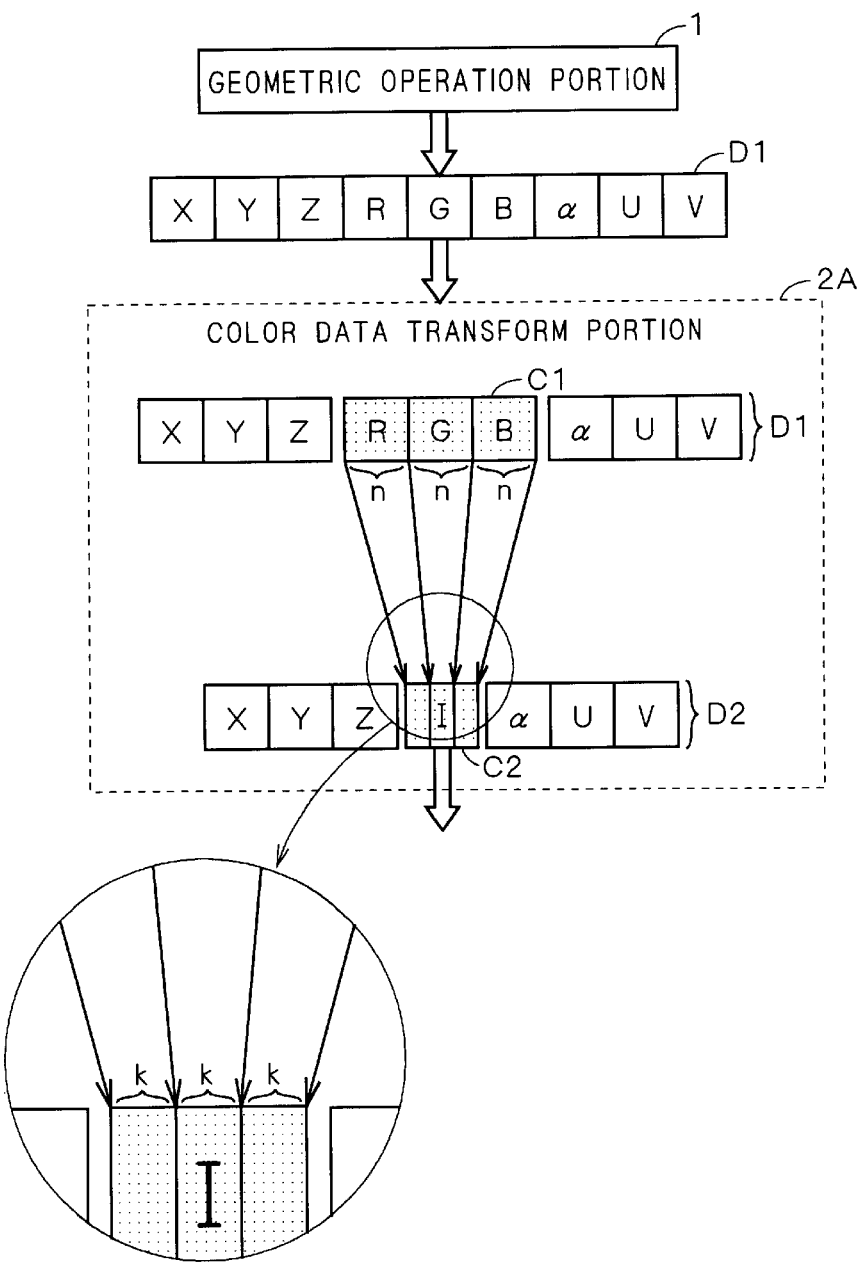
FIG. 2 is an explanation drawing showing the contents of color data operation performed by the color data transform portion in the first preferred embodiment.

FIG. 1 is a block diagram showing the structure of a three-dimensional graphics system according to a first preferred embodiment of the present invention. FIG. 2 is an explanation drawing showing the contents of the color data transforming operation performed by a color data transform portion. Referring to FIGS. 1 and 2, the structure and operation of the first preferred embodiment will now be described.

As shown in FIG. 1, the three-dimensional graphics system of the first preferred embodiment includes a geometric operation portion 1, a color data transform portion 2A, a drawing operation portion 3A, and a drawing unit 4.

The geometric operation portion 1 performs geometric operations on the basis of three-dimensional object data D0 and outputs geometrically-processed three-dimensional data D1; for example, it computes two-dimensionally projected coordinates for each frame as seen from a certain visual point.

As shown in FIG. 2, n bits ($n \geq 2$) are assigned to each of R, G and B in the RGB original color data C1 in the geometrically-processed three-dimensional data D1 provided to the color data transform portion 2A, so that the data can represent $2^{3n}$ kinds of colors. For example, when n=8, it can represent about 16,670,000 kinds of colors.

The color data transform portion 2A extracts the upper k (k<n) bits from the n bits assigned to each of R, G and B in the RGB original color data C1 in the geometrically-processed three-dimensional data D1. It then transforms the RGB original color data C1 into reduced color data C2 in such a way that the sets of k bits are assigned respectively to R, G and B, thus providing color data for the three-dimensional data D2 to be used in the drawing operation. The reduced color data C2 can represent $2^{3k}$ kinds of colors; if k=3, it can represent 512 (=$2^9$) kinds of colors.

As described above, in the three-dimensional graphics system of the first preferred embodiment, the reduced color data C2 of 3k bits, which is fewer than 3n bits of the RGB original color data C1, is used as color data in the three-dimensional data D2 to be used in the drawing operation. For simplicity, the operations may be explained assuming n=8 and k=3 hereinafter.

The drawing operation portion 3A applies drawing operations including color processing operation based on the reduced color data C2 to the three-dimensional data D2 provided for the drawing operation, and it provides three-dimensional graphic drawing data which is defined in pixels on a two-dimensional space assigned in a frame memory.

The drawing unit 4 as display means presents three-dimensional graphics color display on a display screen in a display unit (not shown) on the basis of the three-dimensional graphics drawing data obtained from the drawing operation portion 3A.

The drawing operation portion 3A can smoothly perform the color processing operation if it can recognize display color information corresponding to the 512 kinds of color specifications definable with the reduced color data C2. For example, the drawing operation portion 3A itself may perform the color processing operation using the reduced color data C2 as the display color information.

In this case, since the reduced color data C2 is composed of part of the original color data C1, the color display can be represented using colors similar to those represented by the original color data C1.

Alternatively, the color processing operation can be achieved if the drawing operation portion 3A can access a storage portion containing display color information corresponding to the 512 kinds of color specifications. In this case, the storage portion can be provided inside the drawing operation portion 3A, or it can be provided outside the drawing operation portion 3A.

In this case, when the storage portion contains, as the display color information, 3n-bit information in which n bits are assigned to each of R, G and B as in the RGB original color data C1 in the geometrically-processed three-dimensional data D1, then the display color information can represent colors equivalent to the colors represented by the RGB original color data C1. That is to say, it is possible to specify 512 kinds of colors for the 512 kinds of color specifications from the $2^{3n}$ kinds of colors defined by the RGB original color data C1.

In this way, in the three-dimensional graphics system of the first preferred embodiment, the color data transform portion 2A uses the reduced color data C2 as the color data for the three-dimensional data D2 used in the drawing operation. This reduces the drawing operation time (including the time for reading the three-dimensional data D2 for the drawing operation) consumed by the drawing operation portion 3A by the bit difference between the RGB original color data C1 and the reduced color data C2, $\{3 \cdot (n-3)\}$.

Second Preferred Embodiment

Figure 3:
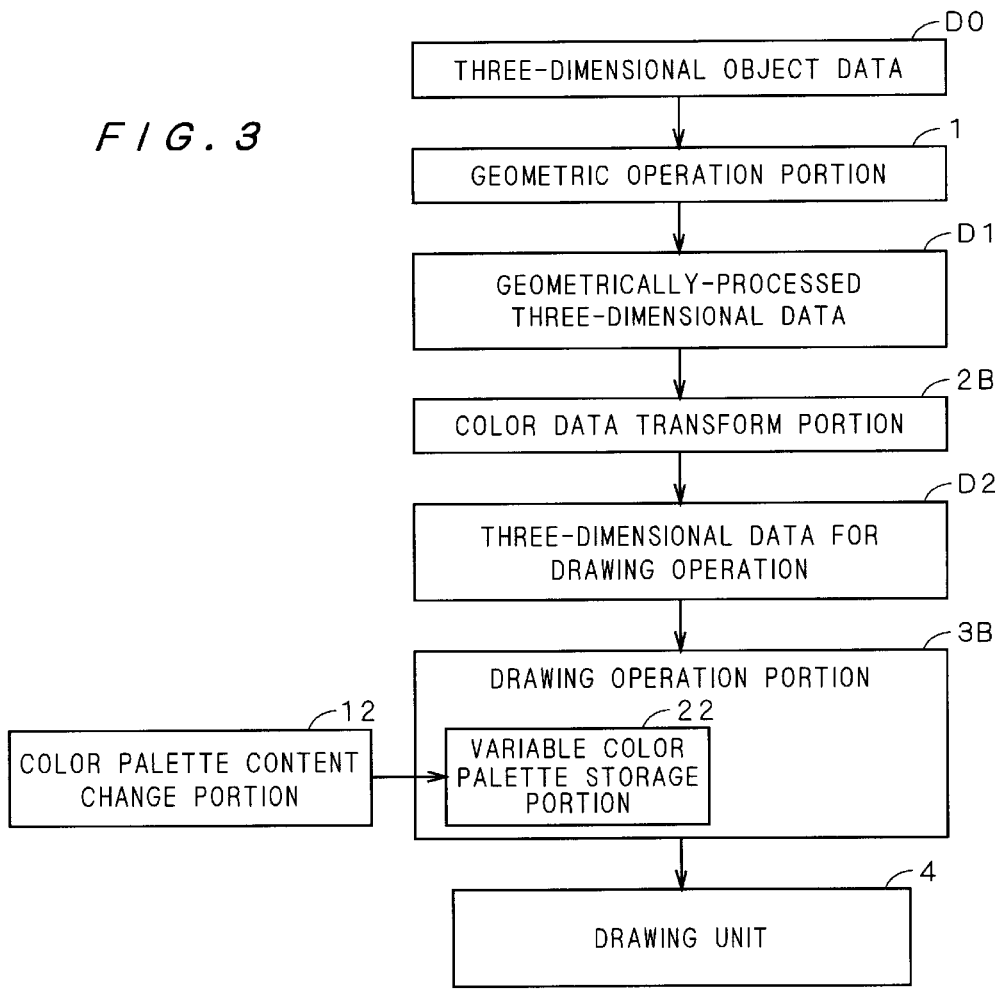
FIG. 3 is a block diagram showing the structure of a three-dimensional graphics system according to a second preferred embodiment of the present invention.
Figure 4:
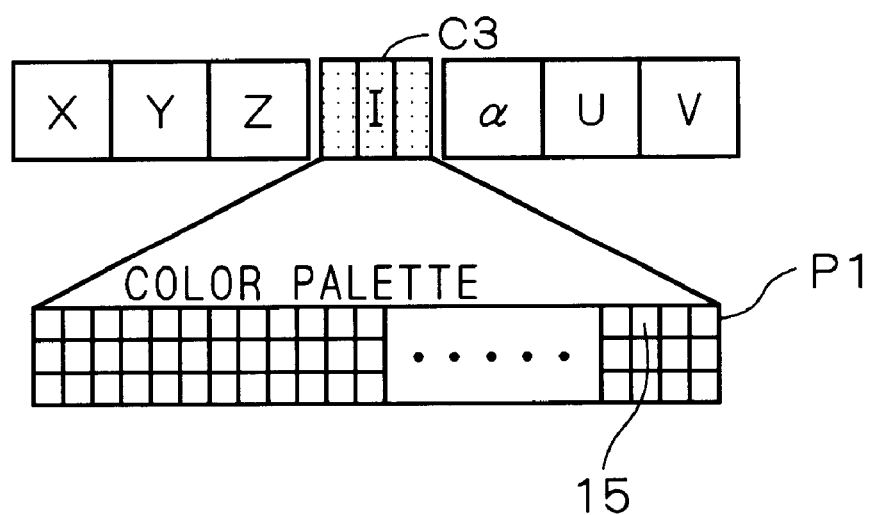
FIG. 4 is an explanation drawing showing the contents of color data operation performed by the color data transform portion in the second preferred embodiment.

FIG. 3 is a block diagram showing the structure of a three-dimensional graphics system according to a second preferred embodiment of the present invention. FIG. 4 is an explanation drawing showing the contents of the color data transforming operation performed by the color data transform portion. The structure and operation of the second preferred embodiment will now be described referring to FIGS. 3 and 4.

As shown in FIG. 3, the three-dimensional graphics system of the second preferred embodiment includes the geometric operation portion 1, a color data transform portion 2B, a drawing operation portion 3B, and the drawing unit 4.

The geometric operation portion 1 performs geometric operations on the basis of the three-dimensional object data D0 and outputs the geometrically-processed three-dimensional data D1.

The color data transform portion 2B applies color data transforming operation to the geometrically-processed three-dimensional data D1 to obtain the three-dimensional data D2 to be used in the drawing operation.

As shown in FIG. 4, like the color data transform portion 2A, the color data transform portion 2B extracts the upper three bits from eight bits for each of R, G and B in the RGB original color data C1 in the geometrically-processed three-dimensional data D1 and it transforms the RGB original color data C1 into index color data C3 capable of indicating 512 kinds of colors, in such a manner that the sets of three bits are assigned respectively to R, G and B. The index color data C3 is one of the reduced color data and the color data for the drawing operation.

The drawing operation portion 3B applies drawing operations including the color processing operation based on the index color data C3 to the three-dimensional data D2 provided for the drawing operation and outputs three-dimensional graphic drawing data to the drawing unit 4. The drawing unit 4 provides three-dimensional graphics display on a display screen in a display unit (not shown) on the basis of the three-dimensional graphic drawing data.

The drawing operation portion 3B has a variable color palette storage portion 22 containing display color information of 512 kinds in a one-to-one correspondence with the 512 kinds of color specifications definable with the index color data C3.

That is to say, the variable color palette storage portion 22 contains a variable color palette P1 having 512-kind display color information 15, and the index color data C3, nine bits in total, can be utilized as the index to the variable color palette P1.

Accordingly, when performing the color processing operation in the drawing operation, the drawing operation portion 3B can smoothly perform the color processing operation by reading from the variable color palette storage portion 22 the display color information corresponding to the color specifications defined by the index color data C3.

Each piece of display color information is set as 24-bit information, eight bits assigned to each of R, G and B as in the RGB original color data C1, so that it contains information equivalent in amount to the RGB original color data C1.

It is therefore possible to represent colors equivalent to those represented by the RGB original color data C1 with the display color information in the variable color palette P1. That is to say, 512 kinds of colors can be specified as the 512 kinds of color specifications from the about 16,670,000 kinds of colors defined by the RGB original color data C1.

Further, the contents of the 512 kinds of display color information in the variable color palette storage portion 22 can be changed by an external color palette content changing portion 12.

As described above, similarly to that of the first preferred embodiment, the three-dimensional graphics system of the second preferred embodiment can reduce the drawing operation time consumed by the drawing operation portion 3B by the bit difference $\{3\cdot(n-3)\}$ between the RGB original color data C1 and the index color data C3.

In addition, the color palette content changing portion 12 can change the contents of the display color information in the variable color palette storage portion 22. Accordingly, when re-representing the same three-dimensional object in different coloring, the colors defined by the three-dimensional graphic drawing data provided to the drawing unit 4 can be changed by changing the contents of the display color information, without the need to change the three-dimensional object data D0, the geometrically-processed three-dimensional data D1, and the three-dimensional data D2 used in the drawing operation.

For example, with a three-dimensional object (vertex data) in which red dots are defined on a blue ground, the three-dimensional object can be easily re-displayed with blue and red inverted by exchanging the contents of the display color information corresponding to the blue specification and the contents of the display color information corresponding to the red specification in the variable color palette storage portion 22.

Conventionally, this process required the geometric operation portion 1 and the drawing operation portion 3B to perform the operations again on the basis of new three-dimensional object data D0 defining the three-dimensional object having blue dots on a red ground. In the second preferred embodiment, however, this process can be achieved just by causing the color palette content changing portion 12 to change the contents of the display color information corresponding to the red and blue color specifications defined by the index color data C3, without changing the three-dimensional data D2 used in the drawing operation.

As described above, the three-dimensional graphics system of the second preferred embodiment provides the following effect in addition to the effect of the first preferred embodiment. That is to say, when re-drawing the same three-dimensional object in different coloring, the drawing operation can be done at higher speed by changing the contents of the display color information in the variable color palette storage portion 22 which correspond to the color specifications defined by the index color data C3, without causing overhead by the geometric operation portion 1, the drawing operation portion 3B, etc., which significantly improves the processing performance of the entire three-dimensional graphics system.

Third Preferred Embodiment

Figure 5:
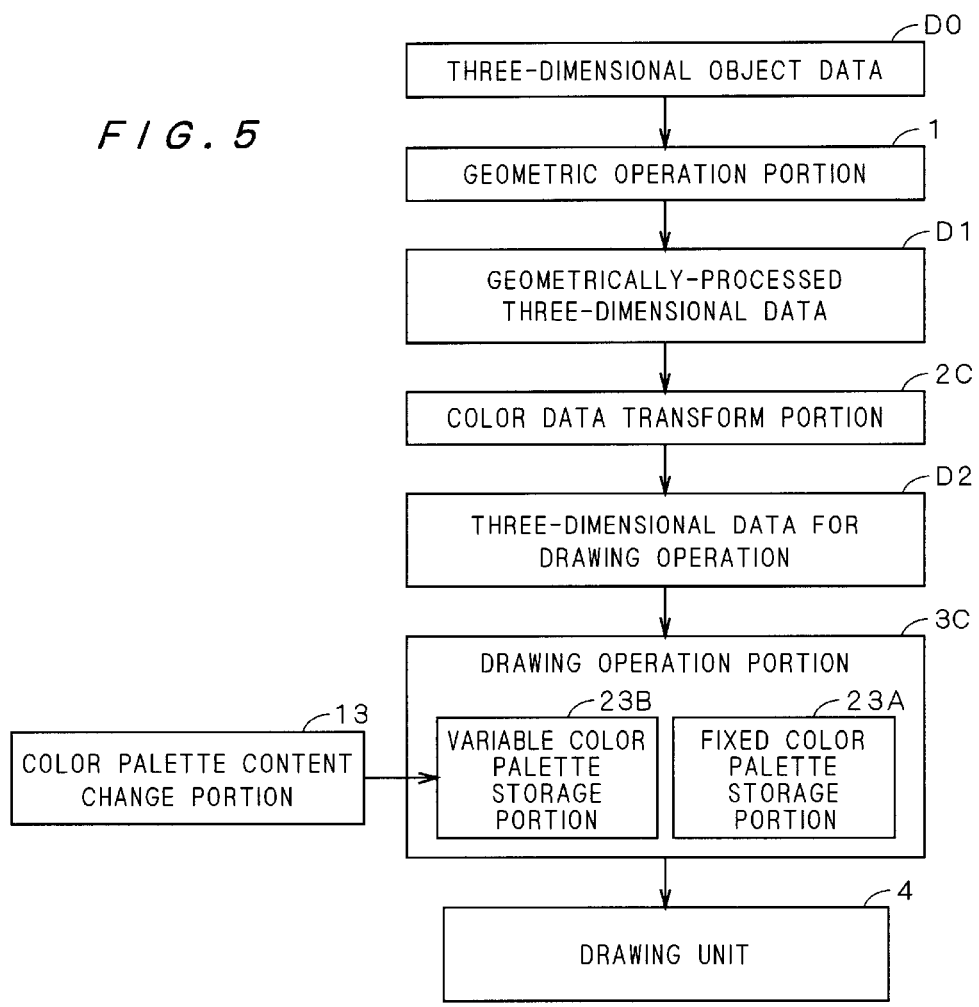
FIG. 5 is a block diagram showing the structure of a three-dimensional graphics system according to a third preferred embodiment of the present invention.
Figure 6:
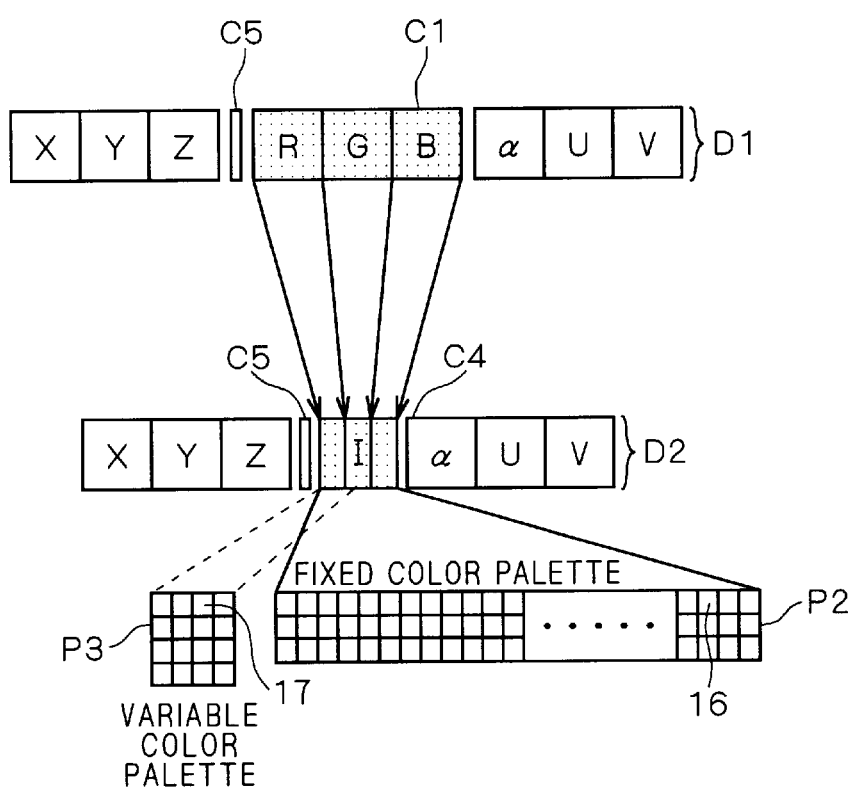
FIG. 6 is an explanation drawing showing the contents of color data operation performed by the color data transform portion in the third preferred embodiment.

FIG. 5 is a block diagram showing the structure of a three-dimensional graphics system according to a third preferred embodiment of the invention. FIG. 6 is an explanation drawing showing the contents of the color data transforming operation carried out by the color data transform portion. The structure and operation of the third preferred embodiment will now be described referring to FIGS. 5 and 6.

As shown in FIG. 5, the three-dimensional graphics system of the third preferred embodiment includes the geometric operation portion 1, a color data transform portion 2C, a drawing operation portion 3C, and the drawing unit 4.

The geometric operation portion 1 performs geometric operations on the basis of the three-dimensional object data D0 and outputs the geometrically-processed three-dimensional data D1.

The color data transform portion 2C applies the color data transforming operation to the geometrically-processed three-dimensional data D1 to obtain the three-dimensional data D2 to be used in the drawing operation.

As shown in FIG. 6, a color palette selecting flag C5 is added as the geometrically-processed three-dimensional data D1. The color palette selecting flag C5 is display color selecting information already added to the three-dimensional object data D0, which is one-bit information defining the contents of the color processing operation performed by the drawing operation portion 3C.

Similarly to the color data transform portion 2A, the color data transform portion 2C extracts the upper three bits from each eight bits for R, G and B in the RGB original color data C1 in the geometrically-processed three-dimensional data D1 and transforms the RGB original color data C1 into index color data C4 capable of indicating 512 kinds of colors, in such a manner that the sets of three bits are assigned respectively to R, G and B. It also adds the intact color palette selecting flag C5 in the geometrically-processed three-dimensional data D1 to the three-dimensional data D2 to be used in the drawing operation. The index color data C4 is one of the reduced color data and the color data used in the drawing operation.

The drawing operation portion 3C applies the drawing operation to the three-dimensional data D2 provided for the drawing operation on the basis of the index color data C4 and outputs the three-dimensional graphic drawing data to the drawing unit 4.

The drawing operation portion 3C includes a fixed color palette storage portion 23A, which contains 512 kinds of display color information in a one-to-one correspondence with the 512 kinds of color specifications that can be defined with all bits in the index color data C4.

The drawing operation portion 3C also includes a variable color palette storage portion 23B, which contains 16 kinds of display color information in a one-to-one correspondence with 16 (=$2^4$) kinds of color specifications that can be defined with part, four bits (e.g. the upper four bits), of the index color data C4.

That is to say, as shown in FIG. 6, the fixed color palette storage portion 23A contains a fixed color palette P2 containing 512 kinds of display color information 16 and the variable color palette storage portion 23B contains a variable color palette P3 containing 16 kinds of display color information 17.

The index color data C4, nine bits in total, can be used as the index to the fixed color palette P2 and the part of the index color data C4, four bits in total, can be used as the index to the variable color palette P3.

Hence, the drawing operation portion 3C can perform the color processing operation in the drawing operation as follows.

When the color palette selecting flag C5 indicates the fixed color palette display, the drawing operation portion 3C reads the display color information corresponding to the color specifications defined by all bits in the index color data C4 from the fixed color palette storage portion 23A and performs a first color processing operation. When the color palette selecting flag C5 indicates the variable color palette display, the drawing operation portion 3C reads the display color information corresponding to the color specifications defined by the given four bits in the index color data C4 from the variable color palette storage portion 23B and performs a second color processing operation. In this way, the drawing operation portion 3C can smoothly perform the first color processing operation based on the 512 kinds of fixed colors or the second color processing operation based on the 16 kinds of variable colors.

The display color information in the fixed color palette P2 and the variable color palette P3 stored respectively in the fixed color palette storage portion 23A and the variable color palette storage portion 23B are set as 24-bit information in which eight bits are assigned to each of R, G and B like those in the RGB original color data C1, so that the display color information is equivalent in amount to the RGB original color data C1.

Accordingly it is possible to represent colors equivalent to the colors represented by the RGB original color data C1 with the display color information in the fixed color palette P2 and the variable color palette P3. That is to say, 512 kinds of colors can be specified for the fixed color palette P2 from the about 16,670,000 kinds of colors defined by the RGB original color data C1 and 16 kinds of colors can be specified for the variable color palette P3 from the about 16,670,000 kinds of colors defined by the RGB original color data C1.

The 16 kinds of display color information in the variable color palette storage portion 23B can be changed by an external color palette content changing portion 13.

The drawing unit 4 presents three-dimensional graphic color display on a display screen in a display unit on the basis of the three-dimensional graphic drawing data.

As described above, in the three-dimensional graphics system of the third preferred embodiment, the drawing operation time for the color palette selecting flag C5 is almost negligible, and the system can reduce the drawing operation time consumed by the drawing operation portion 3C by the bit difference $\{3 \cdot (n-3)\}$ between the RGB original color data C1 and the index color data C4, as in the first preferred embodiment.

In addition, the color palette content changing portion 13 can change the contents of the display color information in the variable color palette storage portion 23B, so that, when re-displaying the same three-dimensional object in different coloring, it is possible for the color data transform portion 2C, as in the second preferred embodiment, to change the colors by selecting the variable color palette display with the color palette selecting flag C5 and changing the contents of the color palette in the variable color palette storage portion 23B, without the need for changing the three-dimensional object data D0 etc. at all.

In this way, according to the three-dimensional graphics system of the third preferred embodiment, similarly to that of the second preferred embodiment, when re-drawing the same three-dimensional object in different coloring, the drawing operation can be achieved at higher speed by changing the contents of the display color information in the variable color palette storage portion 23B, without causing overhead by the geometric operation portion 1, the drawing operation portion 3C, etc., which remarkably improves the processing performance of the entire three-dimensional graphics system.

Furthermore, when necessary 512 kinds of display color information is stored in the fixed color palette storage portion 23A whose color palette is kept unchanged, the color display can be always represented by using the same kinds of colors in the first color processing operation carried out by the drawing operation portion 3C.

Fourth Preferred Embodiment

Figure 7:
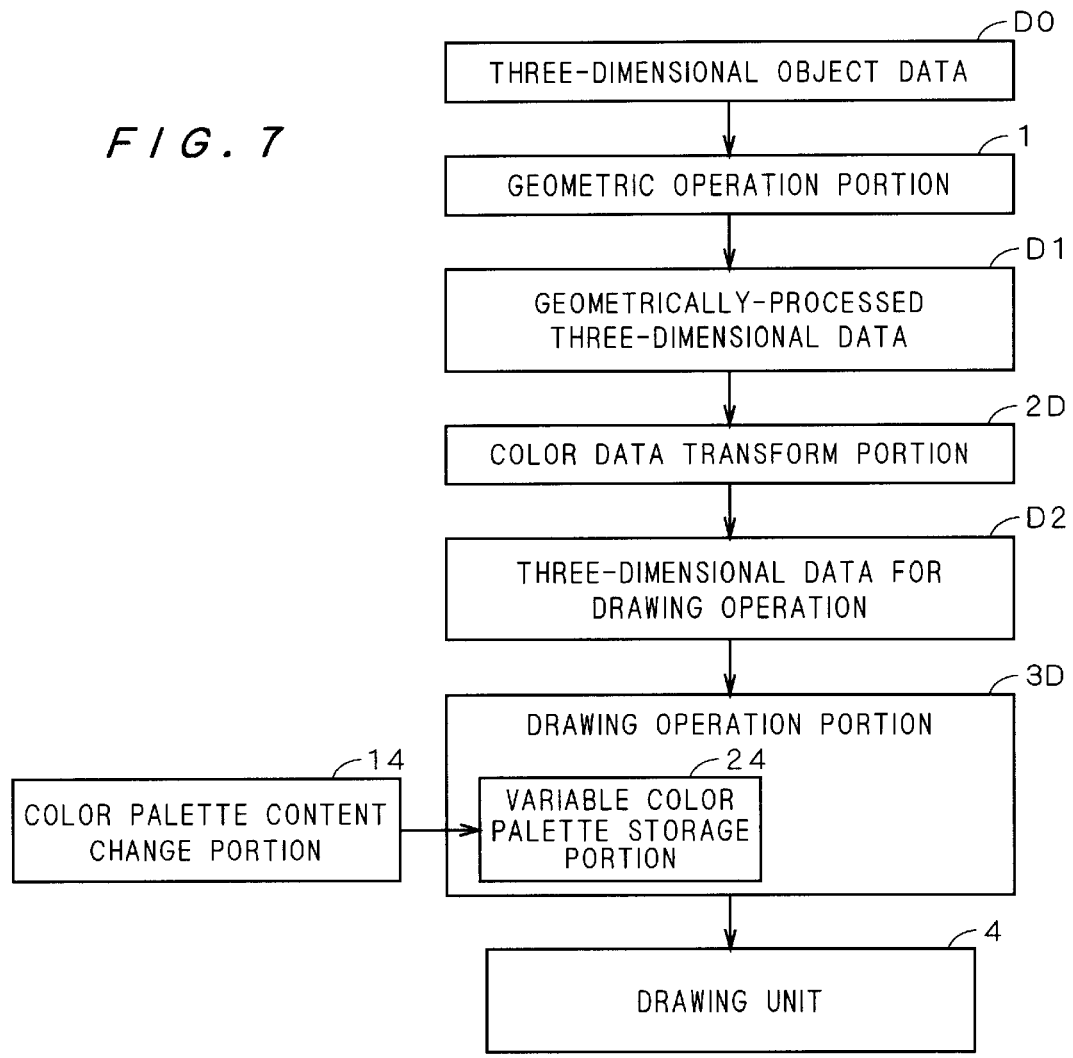
FIG. 7 is a block diagram showing the structure of a three-dimensional graphics system according to a fourth preferred embodiment of the present invention.
Figure 8:
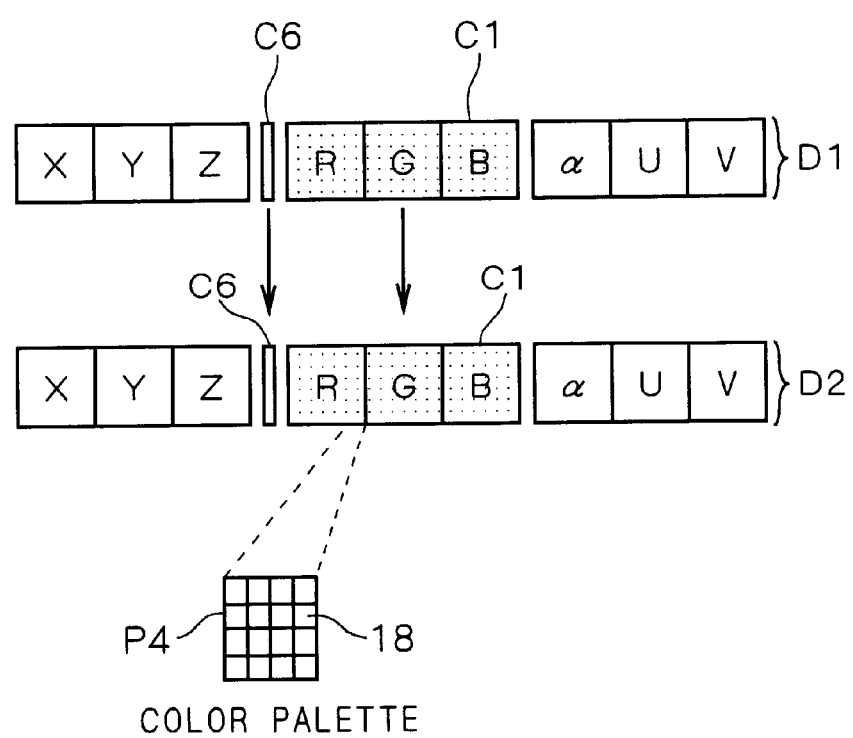
FIG. 8 is an explanation drawing showing the contents of color data operation performed by the color data transform portion in the fourth preferred embodiment.

FIG. 7 is a block diagram showing the structure of a three-dimensional graphics system according to a fourth preferred embodiment of the invention. FIG. 8 is an explanation drawing showing the contents of the color data transforming operation carried out by the color data transform portion. The structure and operation of the fourth preferred embodiment will now be described referring to FIGS. 7 and 8.

As shown in FIG. 7, the three-dimensional graphics system of the fourth preferred embodiment includes the geometric operation portion 1, a color data transform portion 2D, a drawing operation portion 3D, and the drawing unit 4.

The geometric operation portion 1 performs geometric operations on the basis of the three-dimensional object data D0 and outputs the geometrically-processed three-dimensional data D1.

As shown in FIG. 8, a color palette selecting flag C6 is added as the geometrically-processed three-dimensional data D1. The color palette selecting flag C6 is data already added to the three-dimensional object data D0, which is one-bit display color selecting information defining the contents of the color processing operation performed by the drawing operation portion 3D.

In the three-dimensional data D2 to be used in the drawing operation, the color data transform portion 2D uses the RGB original color data C1 and the color palette selecting flag C6 in the geometrically-processed three-dimensional data D1 in their original forms. That is to say, the RGB original color data C1 is used as the color data for the drawing operation.

The drawing operation portion 3D applies drawing operations including the color processing operation based on the RGB original color data C1 to the three-dimensional data D2 provided for the drawing operation and obtains the three-dimensional graphic drawing data.

The drawing operation portion 3D includes a variable color palette storage portion 24, which contains a color palette of 16 kinds in a one-to-one correspondence with 16 kinds of color specifications that can be defined with given four bits (e.g. the lower four bits for R) in the RGB original color data C1.

That is to say, as shown in FIG. 8, the variable color palette storage portion 24 contains a variable color palette P4 containing 16 kinds of display color information 18, and the part, four bits in total, of the RGB original color data C1 can be used as the index to the variable color palette P4.

Accordingly the drawing operation portion 3D can perform the color processing operation in the drawing operation as follows.

When the color palette selecting flag C6 indicates the color palette display, the drawing operation portion 3D reads the display color information corresponding to the color specifications defined by given four bits in the RGB original color data C1 from the variable color palette storage portion 24 and performs a first color processing operation. When the color palette selecting flag C6 indicates normal display, it performs a second color processing operation using the colors represented by all bits in the RGB original color data C1. In this way, the drawing operation portion 3D can smoothly perform the first color processing operation based on the 16 kinds of variable colors or the second color processing operation based on the about 16,670,000 kinds of fixed colors.

Each piece of display color information in the variable color palette P4 is set as 24-bit information in which eight bits are assigned to each of R, G and B as those in the RGB original color data C1. This display color information is therefore equivalent in amount to the RGB original color data C1.

Accordingly colors equivalent to the colors represented by the RGB original color data C1 can be represented with the display color information in the variable color palette P4. That is to say, 16 kinds of colors can be specified from the about 16,670,000 kinds of colors defined by the RGB original color data C1.

Further, an external color palette content changing portion 14 can change the color palette of 16 kinds in the variable color palette storage portion 24.

The drawing unit 4 provides three-dimensional graphics color display on a display screen in a display unit (not shown) on the basis of the three-dimensional graphic drawing data obtained from the drawing operation portion 3D.

In the three-dimensional graphics system of the fourth preferred embodiment, the contents of the display color information in the color palette storage portion 24 in the drawing operation portion 3D can be changed by the color palette content changing portion 14. Accordingly, similarly to the second and third preferred embodiments, when re-displaying the same three-dimensional object in different coloring, it is possible to change the colors by selecting the color palette display with the color palette selecting flag C6 and appropriately changing the contents of the display color information in the variable color palette storage portion 24, without changing the three-dimensional object data D0 at all.

According to the three-dimensional graphics system of the fourth preferred embodiment, when re-drawing the same three-dimensional object in different coloring, the drawing operation can be achieved at higher speed without causing overhead by the drawing operation portion 3D at all, by changing the contents of the display color information in the variable color palette storage portion 24, which significantly improves the processing performance of the entire three-dimensional graphics system.

Further, the color display is represented on the basis of all information in the RGB original color data C1 when the color palette selecting flag C6 indicates the normal display. Accordingly, it is possible to provide display with $2^{3n}$ kinds of colors, without reducing the kinds of display colors in the RGB original color data C1.

While the invention has been described in detail, the foregoing description is in all aspects illustrative and not restrictive. It is understood that numerous other modifications and variations can be devised without departing from the scope of the invention.

What is claimed is:

1. A three-dimensional graphics system comprising:

color data transforming means receiving three-dimensional data defining a three-dimensional object and having original color data with a predetermined number of bits, for transforming said original color data into reduced color data composed of a smaller number of bits than said predetermined number of bits to generate three-dimensional data for operation; and processing means for applying processing including a color processing operation based on said reduced color data to said three-dimensional data for operation to generate graphics drawing data corresponding to said three-dimensional object, wherein said processing means comprising color information storage means containing a plurality of pieces of display color information in a one-to-one correspondence with a plurality of color specifications definable with at least part of said reduced color data, wherein said processing means reads from said color information storage means said display color information corresponding to said color specifications defined by at least part of said reduced color data and performs said color processing operation, wherein at least part of said plurality of pieces of display color information stored in said color information storage means can be changed in its contents, wherein said three-dimensional data further comprises display color selecting information, wherein said three-dimensional data for operation further comprises said display color selecting information, wherein said plurality of pieces of display color information comprise a first number of pieces of first display color information in a one-to-one correspondence with a first number of first color specifications which can be defined with a first number of bits in said reduced color data, and a second number of pieces of second display color information in a one-to-one correspondence with a second number of second color specifications which can be defined with a second number of bits in said reduced color data, wherein said color information storage means comprises first color information storage means containing said first number of pieces of first display color information and second color information storage means containing said second number of pieces of second display color information, wherein said color processing operation performed by said processing means comprises a first color processing operation performed by reading from said first color information storage means said first display color information corresponding to said first color specifications defined by said first number of bits in said reduced color data, and a second color processing operation performed by reading from said second color information storage means said second display color information corresponding to said second color specifications defined by said second number of bits in said reduced color data, wherein said processing means performs one of said first and second color processing operations on the basis of said color selecting information in said three-dimensional data for operation, and wherein said second number of pieces of second display color information stored in said second color information storage means can be changed in its contents.

2. The three-dimensional graphics system according to claim 1, wherein said first number of bits comprises the whole number of bits in said reduced color data, and said second number of bits comprises part of the number of bits in said reduced color data.

3. The three-dimensional graphics system according to claim 1, wherein said first number of pieces of first display color information stored in said first color information storage means cannot be changed.

4. The three-dimensional graphics system according to claim 1, wherein said display color information comprises information equivalent in amount to the information in said original color data.

5. The three-dimensional graphics system according to claim 1, wherein said reduced color data comprises information formed of part of said original color data.

6. The three-dimensional graphics system according to claim 5, wherein said predetermined number of bits comprises 3n (n≧2) bits, said original color data comprises information in which n bits are assigned to each of R, G and B, and said reduced color data comprises information in which k bits (k<n) extracted from each set of said n bits for R, G and B in said original color data are assigned respectively to R, G and B.

7. The three-dimensional graphics system according to claim 6, wherein n=8 and k=3.

* * * * *